United States Patent

Shaw et al.

[11] Patent Number: 5,440,446
[45] Date of Patent: Aug. 8, 1995

[54] ACRYLATE COATING MATERIAL

[75] Inventors: David G. Shaw; Eric Dawson; Daniel Cline; Marc Langlois, all of Tucson, Ariz.

[73] Assignee: Catalina Coatings, Inc., Tucson, Ariz.

[21] Appl. No.: 131,328

[22] Filed: Oct. 4, 1993

[51] Int. Cl.⁶ .................. H01G 2/12; H01G 4/14; H01G 4/20; B32B 15/08
[52] U.S. Cl. ................. 361/301.5; 361/272; 361/313; 361/323; 361/327; 361/304; 428/458; 428/483
[58] Field of Search ......... 361/272, 273, 275.1, 361/301.5, 303, 304, 305, 308.1, 309, 311, 313, 314, 321.6, 323, 327; 428/458, 480, 483

[56] References Cited

U.S. PATENT DOCUMENTS

| | | | |
|---|---|---|---|
| 3,334,002 | 8/1967 | Heywang | 361/273 |
| 3,654,532 | 4/1972 | Rayburn | 361/309 |
| 3,855,507 | 12/1974 | Hoyler | 361/273 |
| 3,993,811 | 11/1976 | Walles | 428/35 |
| 4,229,777 | 10/1980 | Merrill et al. | 361/314 |
| 4,320,437 | 3/1982 | Shaw et al. | 361/303 |
| 4,490,774 | 12/1984 | Olson et al. | 361/311 |
| 4,499,520 | 2/1985 | Cichanewski | 361/311 |
| 4,513,349 | 4/1985 | Olson et al. | 361/311 |
| 4,515,931 | 5/1985 | Olson et al. | 526/323 |
| 4,533,710 | 8/1985 | Olson et al. | 526/323 |
| 4,584,628 | 4/1986 | Cichanowski | 361/309 |
| 4,586,111 | 4/1986 | Cichanowski | 361/323 |
| 4,613,518 | 9/1986 | Ham et al. | 427/38 |
| 4,618,911 | 10/1986 | Cichanowski et al. | 361/308.2 |
| 4,647,818 | 3/1987 | Ham | 315/111 |
| 4,682,565 | 7/1987 | Carrico | 118/719 |
| 4,696,719 | 9/1987 | Bischoff | 202/205 |
| 4,722,515 | 2/1988 | Ham | 261/142 |
| 4,728,701 | 3/1988 | Jarvis et al. | 526/65 |
| 4,842,893 | 6/1989 | Yializis et al. | 427/497 |
| 4,919,985 | 4/1990 | Asai et al. | 428/36.6 |
| 4,954,371 | 9/1990 | Yializis | 427/497 |
| 5,018,048 | 5/1991 | Shaw et al. | 361/323 |
| 5,021,298 | 6/1991 | Revell | 428/458 |
| 5,032,461 | 7/1991 | Shaw et al. | 428/461 |
| 5,097,800 | 3/1992 | Shaw et al. | 118/730 |
| 5,280,084 | 1/1994 | Paul | 525/375 |

FOREIGN PATENT DOCUMENTS 57-30769 2/1982 Japan.

OTHER PUBLICATIONS

*Optical Interference Coatings For Inhibiting of Counterfeiting*, Optica Acta, 1973, vol. 20, No. 12, 925–937.

Primary Examiner—Geoffrey S. Evans
Assistant Examiner—Gregory L. Mills
Attorney, Agent, or Firm—Christie, Parker & Hale

[57] ABSTRACT

Material for winding high voltage capacitors is prepared by evaporating polyfunctional acrylate monomer having a molecular rate in the range of from 150 to 600 and condensing the acrylate as a monomer film on a dielectric substrate. The acrylate is polymerized by irradiation by ultraviolet or electrons. Sometimes both faces of the dielectric are coated to protect the thermoplastic dielectric from swelling when exposed to dielectric liquid. The metallized layer provides an electrode of the capacitor. A polymerized acrylate layer may be applied over the metal layer. Electrical contact can be made to the metal layer by Schooping even though the metallized layer is covered by a layer of acrylate. Low oxygen permeability polypropylene, polyester or nylon sheet has a layer of crosslinked acrylate and an oxygen barrier layer formed of silicon oxide, aluminum oxide or metal. Adhesion is enhanced by plasma or corona treatment of a surface immediately before deposition. Condensation efficiency is also enhanced by chilling the substrate on which the acrylate is condensed.

12 Claims, 4 Drawing Sheets

ACRYLATE COATING MATERIAL

BACKGROUND OF THE INVENTION

This invention relates to high-voltage capacitors and the material employed for fabricating such capacitors. Techniques for acrylate deposition and adhesion are also improved.

Electrical capacitors are used for storing energy in a variety of applications. Operating voltages for such devices range from a few volts, such as those used in miniature electronic circuits, to thousands of volts, such as those used in power utility applications.

Very broadly, a capacitor has a pair of conductive "plates" or electrodes separated by a dielectric material. The conducting electrodes are typically composed of copper, silver, aluminum foil, or vacuum deposited zinc or aluminum. Capacitors utilize a variety of dielectrics ranging from ceramic materials, metal oxides, particularly tantalum oxide, plastic sheets or films, and paper.

For low and medium voltages (generally below 600 volts) metallized sheet dielectrics are commonly used. At voltages between about 200 and 600 volts, such metallized capacitors are usually partly impregnated with a dielectric liquid. The dielectric liquid penetrates the edges of a roll of sheet material from the ends of the edges of a roll of sheet material from the ends of the capacitor and any loose turns in the capacitor for filling voids and eliminating corona discharge which erodes the dielectric material.

Higher voltage capacitors are generally constructed of aluminum foil electrodes and sheet dielectric material such as a thermoplastic polypropylene and polyester film. Capacitors intended for service at more than about 600 volts are completely impregnated with a dielectric liquid with good gas absorbing properties. Typical dielectric liquids with good gas absorbing properties are PXE (phenyl xylyl ethane), MIPB (mono isopropyl biphenyl), DOP (dioctyl phthalate), castor oil, polypropylene glycol and mineral oil.

High voltage capacitors have not been able to take advantage of the self healing properties of metallized electrodes. The dielectric liquid causes swelling of the thermoplastic sheets, which causes cracking of the thin film metal electrode and an open circuit quickly develops. Dry metallized capacitors are subject to corrosion of the metallized zinc or aluminum electrodes in humid environments. Protection from such corrosion is desirable.

U.S. Pat. No. 4,842,893 discloses coating of unstated substrates with a film of cured polyfunctional acrylate and a deposit of aluminum. It is stated that the thin film coating may be useful for food packaging or as a protective coating for metal or other substrates.

The technology described in U.S. Pat. No. 4,842,893 is employed in additional patents such as U.S. Pat. Nos. 4,499,520, 4,584,628, 4,618,911, 4,682,565, 5,018,048, 5,032,461 and 5,125,138 for making monolithic capacitors. These have alternating layers of metal capacitor electrodes and deposited acrylate polymer dielectric. In a monolithic capacitor there is a layer of dielectric material deposited between layers of metal. There is no substrate between the metal layers.

One of the advantages of a thin film capacitor is its self healing ability in the event of a short circuit between electrodes. A short circuit generates a tiny arc which vaporizes metal and dielectric. In a monolithic capacitor, the vaporized material has limited chance to escape and the capacitor may be damaged.

It would be desirable to have wound capacitors made with metallized film for higher voltages where self healing can occur, and often where it is necessary that the capacitor be liquid filled. A wound capacitor has one or more sheets of dielectric coated with a metal layer wrapped into a cylinder to form a capacitor.

Many products, including many food products, are packaged in thin plastic sheet bags or the like. The thin films are desirably resistant to permeation by oxygen, water vapor and odorous gases. This can, for example, be important for protecting a food from environmental gases and also for retaining the aroma of food as it is stored.

Such barrier films are commonly made of costly plastics because less costly films are too permeable to oxygen or water to give a long shelf life. Reduced cost barrier films are highly desirable.

U.S. Pat. No. 5,021,298 describes coating of a polyolefin film substrate with a smooth layer of any plastic except polyvinylidene chloride and then vacuum metallizing the plastic so that the metal forms a barrier film. It is not necessary that the plastic itself be a barrier material. It would be desirable, however, to enhance the resistance of such a sheet to permeation by environmental gases, and also to provide protection for the metal against corrosion or the like.

SUMMARY OF THE INVENTION

It has now been discovered that such metallized electrodes may be protected from damage by corrosion or by dielectric liquids by applying coatings of resistant polymers on one or both faces of the dielectric. During development of a suitable dielectric sheet, problems were encountered in obtaining coating efficiency, adhesion, and curing. Such problems have been addressed and solved.

There is, therefore, provided in practice of this invention a sheet material suitable for winding a metallized sheet capacitor employing as a substrate a thermoplastic dielectric sheet. A conductive metal layer is deposited on at least one face of the dielectric sheet. One layer of polymerized acrylate is formed on the same face of the dielectric sheet as the conductive layer, and another layer of polymerized acrylate may be formed on the opposite face of the dielectric sheet. The acrylate layers adhere to the metallized layer and prevent it from cracking if the dielectric sheet swells. Low oxygen and water permeability of the cured acrylate helps minimize corrosion of the electrodes. Coatings on both faces of the sheet help isolate the dielectric sheet from dielectric liquid in a capacitor.

In another embodiment a barrier sheet with low oxygen permeability has a polymer film substrate coated with a crosslinked acrylate layer and a layer of metal. The acrylate layer is a polymerization product of an acrylate monomer having a molecular weight in the range of from 150 to 600. Preferably, there is another crosslinked acrylate layer over the metal layer.

The acrylate layers are formed by evaporating an acrylate monomer having a molecular weight in the range of from 150 to 600, preferably in the range of from 200 to 400, and condensing the monomer on a face of the sheet substrate as a monomer film. The acrylate monomer is then polymerized for forming the acrylate layer. Adhesion is enhanced by selecting monomers having a shrinkage upon curing of up to about 10%.

Modifying the surface of the dielectric sheet for increasing its surface energy, preferably by plasma treatment, enhances curing or polymerization of the film by an electron beam or ultraviolet radiation. Chilling the substrate enhances deposition efficiency.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
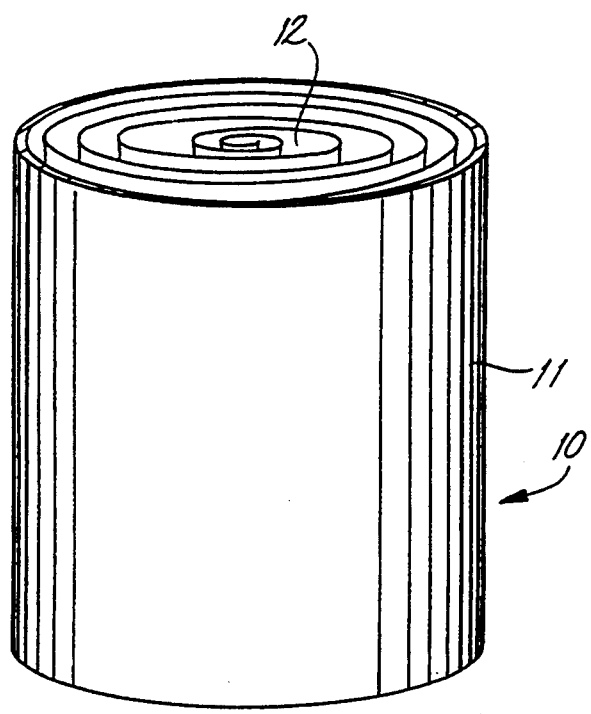
FIG. 1 illustrates schematically a metallized sheet capacitor constructed according to principles of this invention.

An exemplary capacitor 10 comprises a can 11, the end of which is cut away in FIG. 1 to show the roll of capacitor material 12 inside the can. The layers of material forming the capacitor are wound into a cylindrical roll. In effect, the roll of capacitor material comprises alternating layers of metal and dielectric coiled in a tight spiral. The metal layers form the electrodes of the capacitor and the dielectric material between the electrodes permits accumulation of charge in the capacitor. Such a capacitor, intended for use at higher voltages, may be filled with a dielectric liquid such as those mentioned above. Preferred dielectric liquids are PXE, MIPB and DOP.

FIG. 2 illustrates in three fragmentary transverse cross sections exemplary materials for winding such a capacitor. It will be recognized that in the drawings various layers of the capacitor materials are drawn schematically and at a scale suitable for illustration rather than at the scale of the actual material.

A sheet suitable for winding a capacitor has a thermoplastic substrate 13 such as thin polypropylene or polyester sheet which has a stable dielectric constant and high dielectric strength. Suitable substrates also include copolymers of such materials and coextruded sheets. A layer of metal 14 which may be vacuum deposited or sputtered is formed on at least one face of the substrate. A layer of polymerized acrylate 16 is deposited either over or under the metal layer as described hereinafter. In the embodiment illustrated in FIG. 2a, another layer of polymerized acrylate 17 is formed on the opposite face of the substrate.

Figure 2A:
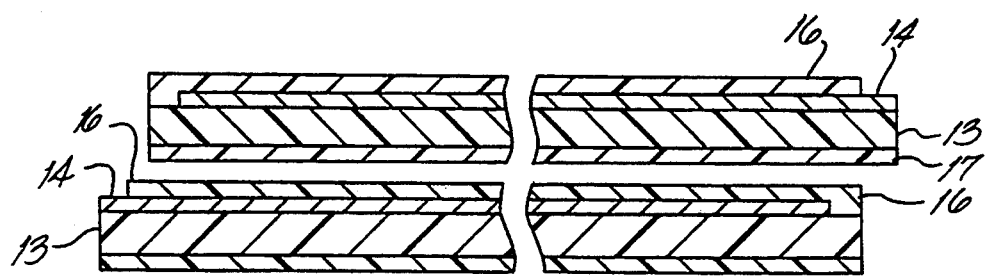
FIGS. 2a-2c illustrate in three transverse cross sections materials suitable for winding a capacitor, FIG. 2a illustrating two coated sheets as used in a capacitor, FIG. 2b illustrating a sheet coated on only one face, and FIG. 2c illustrating a sheet with the coating sequence reversed.

The two sheets of material suitable for forming a capacitor are illustrated in FIG. 2a as they are sometimes used in capacitors. Each sheet has a portion of the metallized layer 14 exposed along an edge of the sheet. That is, a portion of the metallized layer is not covered by an insulating layer of acrylate in this embodiment. These exposed edges of the metal layer are at opposite edges of adjacent sheets in the capacitor and provide an area to which electrical contact can be made so that alternate sheets of the capacitor material form the opposite plates of the capacitor.

Figure 2B:
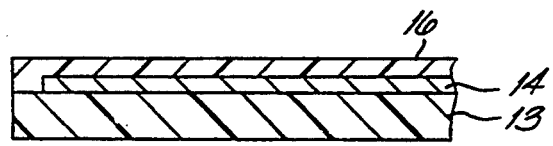

FIG. 2b illustrates another embodiment of sheet for forming a rolled capacitor. Here a layer of metal 14 is deposited on the substrate 13 and a layer of polymerized acrylate 16 is formed over the metal layer. The entire metal layer is covered with acrylate. Only one face of the substrate has a coating of acrylate.

Figure 2C:
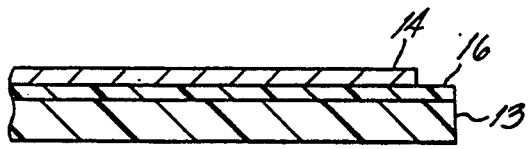

The embodiment illustrated in FIG. 2c reverses the layers on the substrate. In this embodiment there is a layer of polymerized acrylate 16 formed directly on the substrate 13. In direct contact with and over the acrylate layer is a deposited layer of metal 14. Again, there is no acrylate layer on the opposite face of the substrate. The metal may extend all the way to each edge of the sheet or may be spaced a short distance from the edge of the sheet along one edge.

Figure 3:
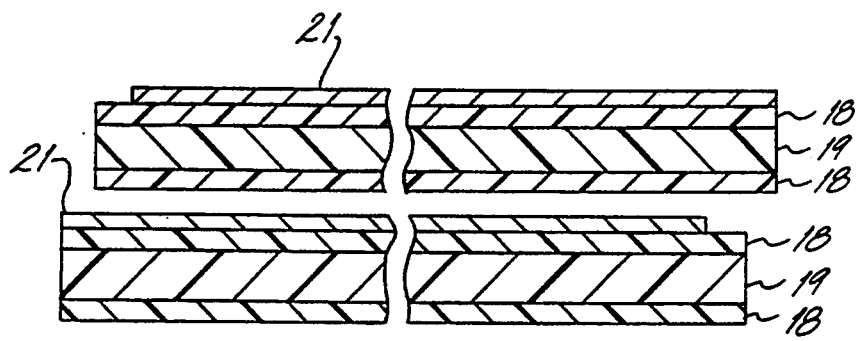
FIGS. 3, 4 and 5 illustrate, in fragmentary transverse cross section, other embodiments of material suitable for winding capacitors.

FIG. 3 illustrates a variation of the capacitor material, the merits of which will become apparent. In this embodiment there is a layer of polymerized acrylate 18 on each face of a thermoplastic substrate 19. A layer of metal 21 is deposited on top of one of the acrylate layers.

Figure 4:
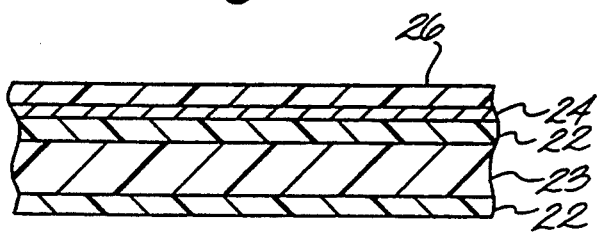

FIG. 4 illustrates another slight variation from an embodiment as illustrated in FIG. 3. In this embodiment there is a layer of polymerized acrylate 22 on each face of a substrate 23. A layer of metal 24 is deposited over at least one of the acrylate layers. A third layer of polymerized acrylate 26 is formed over the layer of metal. Any of these variations may be used in selected embodiments for forming capacitors.

Figure 5:
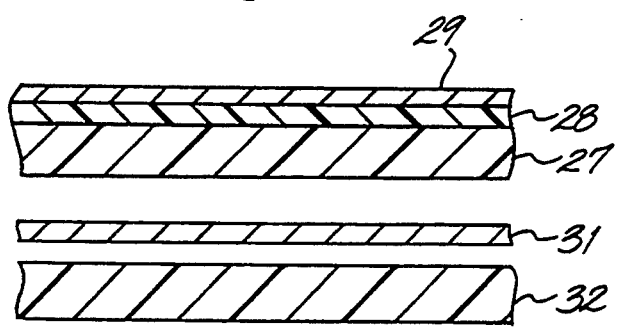

It is not always required that a capacitor be formed with both electrodes being metallized sheets of dielectric material. Thus, for example, as illustrated in FIG. 5, a capacitor may have one electrode formed on a thermoplastic substrate 27. A layer of polymerized acrylate 28 is formed on each face of the substrate. A layer of metal 29 is deposited for forming the one electrode. The other electrode in such a capacitor comprises a sheet of aluminum foil 31. That electrode may be separated from an adjacent layer of metal (not shown) on another substrate via a sheet 32 of dielectric materials such as polypropylene.

As mentioned above, the polypropylene and polyester materials are desirable as dielectrics for capacitors since they have a stable dielectric constant and high dielectric strength. If a metallized polypropylene, for example, is tried in a liquid filled capacitor, the thermoplastic apparently swells and ruptures the thin metallized layer. Open circuits develop within minutes at elevated temperatures characteristic of capacitor operation. It has been found, however, that by having a very thin layer of polymerized acrylate in direct contact with the metallized electrode, the damage caused by dielectric liquid can be avoided. It is believed that the thermoset acrylate supports or stabilizes the metal film and prevents cracking despite swelling of the film substrate.

If the acrylate layer is over the metal layer, it protects the metal layer from corrosion. Although it does not appear to be necessary for forming certain capacitors, if both faces of the dielectric sheet are coated with a layer of cured acrylate, the polymer film between the layers is isolated from dielectric liquid in a capacitor, and swelling is avoided. It is desirable to employ an extremely thin layer of acrylate so that the maximum thickness of dielectric can be used with a minimum spacing between the electrodes.

The acrylate layers in the various embodiments are preferably deposited in the form of a vaporized acrylate monomer. The monomer film is irradiated with ultraviolet or an electron beam to cause polymerization of the acrylate to form a monolithic layer. Polymerization by irradiation is a conventional practice and the electron flux required or wavelength and total flux of ultraviolet used are commonly known.

Evaporation of the monomer is preferably from flash evaporation apparatus as described in U.S. Pat. Nos. 4,722,515, 4,696,719, 4,842,893, 4,954,371 and 5,097,800. These patents also describe polymerization of acrylate by radiation. In such flash evaporation apparatus, liquid acrylate monomer is injected into a heated chamber as 1 to 50 micrometer droplets. The elevated temperature of the chamber vaporizes the droplets to produce a monomer vapor. The monomer vapor fills a generally cylindrical chamber with a longitudinal slot forming a nozzle through which the monomer vapor flows. A typical chamber behind the nozzle is a cylinder about 10 centimeters diameter with a length corresponding to the width of the substrate on which the monomer is condensed. The walls of the chamber may be maintained at a temperature in the order of 200° to 320° C.

Two styles of evaporator are suitable. In one of them, the orifice for injecting droplets and flash evaporator are connected to one end of the nozzle cylinder. In the other style, the injector and flash evaporator section is attached in the center of the nozzle chamber like a T.

Figure 6:
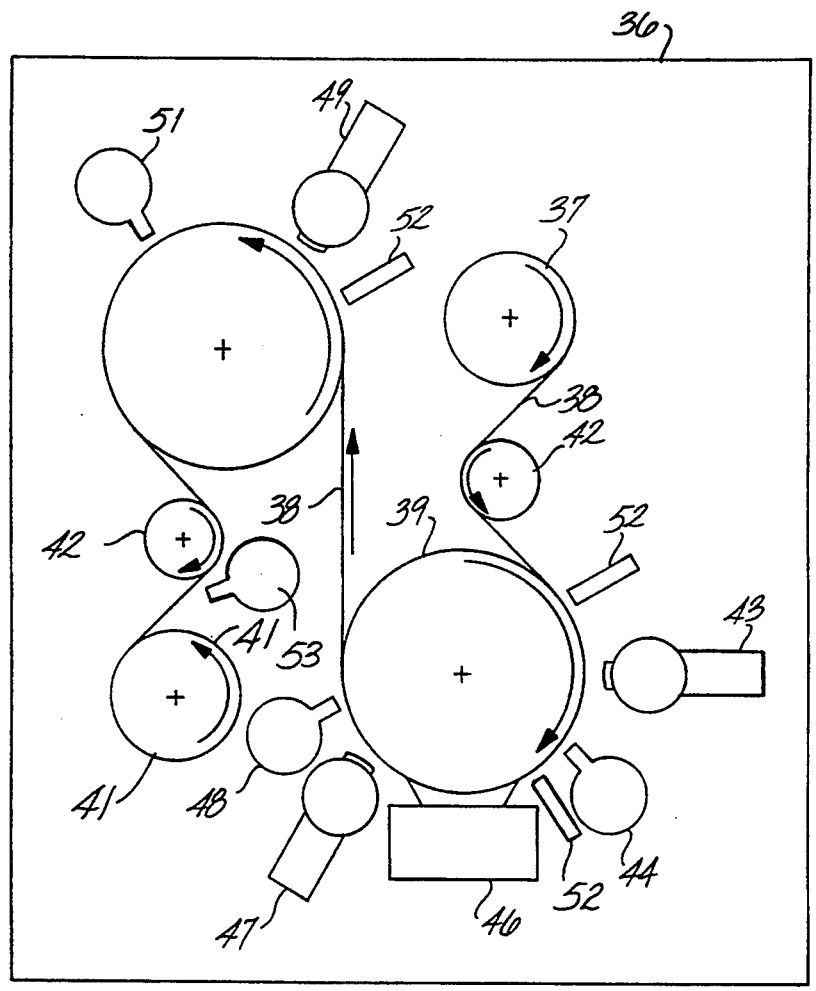
FIG. 6 is a schematic illustration of coating apparatus for forming such a capacitor sheet material.
Figure 7:
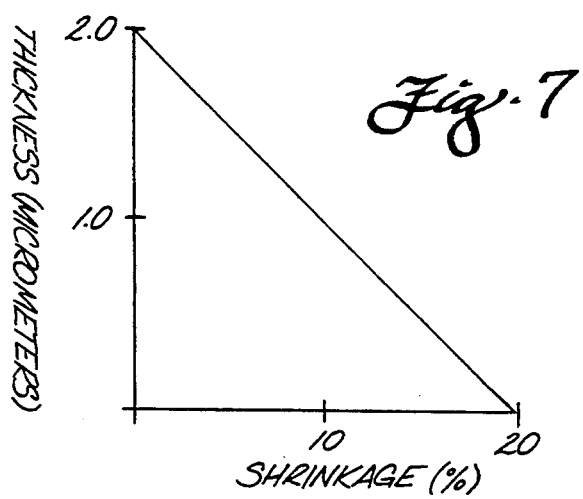
FIG. 7 is a graph with the axes representing acrylate shrinkage and layer thickness, respectively.

A suitable apparatus for coating the substrate with acrylate and metal layers is illustrated schematically in FIG. 6. All of the coating equipment is positioned in a conventional vacuum chamber 36. A roll of polypropylene, polyester or nylon sheet is mounted on a pay-out reel 37. The sheet 38 forming the substrate is wrapped around a first rotatable drum 39, around a second rotatable drum 40, and fed to a take-up reel 41. Idler rolls 42 are employed, as appropriate, for guiding the sheet material from the payout reel to the drums and to the take-up reel.

A flash evaporator 43 is mounted in proximity to the drum at a first coating station. The flash evaporator deposits a layer or film of acrylate monomer on the substrate sheet as it travels around the drum. After being coated with acrylate monomer the substrate sheet passes an irradiation station where the acrylate is irradiated by a source 44 such as an electron gun or source of ultraviolet radiation. The radiation or electron bombardment of the film induces polymerization of the acrylate monomer.

The sheet then passes a metallization station 46 where a coating of metal for an electrode is applied by vacuum metallizing or sputtering. The sheet then passes another flash evaporator 47 where another layer of acrylate monomer is deposited for forming a protective layer over the metal. This layer of monomer is cured by irradiation from an ultraviolet or electron beam source 48 adjacent the drum. Depending on whether a layer of acrylate is above or below the metal layer, either of the evaporators 43 or 47 may be used. Clearly, if the metal layer is to be sandwiched between layers of acrylate, both evaporators and their respective radiation sources are used.

The sheet then passes to the second drum 40 and past another flash evaporator 49 where another layer of acrylate monomer is deposited. This layer of monomer is cured by irradiation from an ultraviolet or electron beam source 51 adjacent the second drum. The two drums are arranged so that the first evaporators adjacent to the first drum apply acrylate to one face of the sheet and the evaporator 49 adjacent to the second drum applies a layer of acrylate to the opposite face of the sheet.

The sheet coated on both faces with acrylate layer and at least one face with a metal layer is wound onto the take-up reel 41. The roll of sheet is removed from the vacuum system for slitting and winding into capacitors or for other uses as described hereinafter.

The acrylate resins employed from making the dielectric layer are monomers having a molecular weight in the range of from 150 to 600. Preferably, the monomers have a molecular weight in the range of from 200 to 400. Higher molecular weight fluorinated acrylates or methacrylates may be equivalent to these lower molecular weight materials and also be used for forming a deposited acrylate layer. For example, a fluorinated acrylate with a molecular weight of about 2000 evaporates and condenses similar to a non-fluorinated acrylate having a molecular weight in the order of 300. The acceptable range of molecular weights for fluorinated acrylates is about 400 to 3000. Fluorinated acrylates include monoacrylates, diacrylates, and methacrylates. Fluorinated methacrylates are fast cure. Whereas methacrylates are generally too slow curing to be desirable, the fluorinated methacrylates cure rapidly. Chlorinated acrylates may also be useful.

If the molecular weight is below about 150, the monomer is too volatile and does not condense well for forming a monomer film. Monomer that does not condense on the desired substrate may foul vacuum pumps and hinder operation of an electron gun used for polymerizing the resin. If the molecular weight is more than about 600 the monomer does not evaporate readily in the flash evaporator at temperatures safely below the decomposition temperature of the monomer.

When the monomers polymerize, there may be shrinkage of the film. Excessive shrinkage may cause poor adhesion of the layer on the substrate. Adhesion of the layer to the substrate is also dependent on thickness of the layer. A thin layer may tolerate greater shrinkage without loss of adhesion than a thick layer. Shrinkage up to about 15 to 20% can be tolerated in the thin layers used in the acrylate layers since they are very thin. However, it is preferred that the shrinkage be less than 10% for reliable coating adhesion.

It is desirable that the thickness of the acrylate layer be sufficient for smoothing any surface roughness of the underlying substrate. For example, polypropylene may have a surface roughness in the order of $\frac{1}{2}$ to one micrometer. A layer of acrylate in the same order, namely about $\frac{1}{2}$ to one micrometer thick is adequate for smoothing the surface.

Suitable acrylates not only have a molecular weight in the appropriate range, they also have a "chemistry" that does not hinder adhesion. Generally, more polar acrylates have better adhesion to metal layers than less polar monomers. Long hydrocarbon chains may hinder adhesion to metal but may be an advantage for depositing on non-polar surfaces. For example, lauryl acrylate has a long chain that is hypothesized to be aligned away from the substrate and hinder adhesion to deposited metal layers.

A typical monomer used for flash evaporation includes an appreciable amount of diacrylate and/or triacrylate to promote crosslinking. Blends of acrylates may be employed for obtaining desired evaporation and condensation characteristics and adhesion, and for controlled shrinkage of the deposited film during polymerization.

Suitable monomers are those that can be flash evaporated in a vacuum chamber at a temperature below the thermal decomposition temperature of the monomer and below a temperature at which polymerization occurs in less than a few seconds at the evaporation temperature. The mean time of monomer in the flash evaporation apparatus is typically less than one second. Thermal decomposition, or polymerization are to be avoided to minimize fouling of the evaporation apparatus. The monomers selected should also be readily capable of crosslinking when exposed to ultraviolet or electron beam radiation.

The monomer composition may comprise a mixture of monoacrylates and diacrylates. Triacrylates tend to be reactive and may polymerize at the evaporation temperatures. Generally speaking, the shrinkage is reduced with higher molecular weight materials.

Generally it is desirable that at least a major portion of the acrylate monomer evaporated is a polyfunctional acrylate for crosslinking. An important feature of the polymerized acrylate coating is that it has good solvent resistance for inhibiting attack by the dielectric liquid in a capacitor. Preferably, the acrylate comprises at least 70 percent polyfunctional acrylates such as diacrylate or triacrylate. If the degree of crosslinking is too low the polymerized acrylate layer may not have adequate solvent resistance or cure speed.

There are situations when less than half of the acrylate monomer comprises polyfunctional acrylates. For example, in a dry capacitor film one composition comprises about 80% monoacrylate and 20% diacrylate. The high proportion of monoacrylate is used since it has a high dielectric constant. The diacrylate cross links to give strength to the layer, however, the layer is not as strong as when higher proportions of polyfunctional acrylate are used.

Preferably, the molecular weight of the acrylate monomer is in the range of from 200 to 400. If the molecular weight is less than about 200, the monomer evaporates readily, but may not condense quantitatively on the substrate without chilling of the substrate. If the molecular weight is more than about 400, the monomers become increasingly difficult to evaporate and higher evaporation temperatures are required. As mentioned above, some fluorinated methacrylates with higher molecular weights are equivalent to lower molecular weight non-fluorinated acrylates.

Preferably, the acrylate monomer has a vapor pressure at 25° C. in the range of from 1 to 20 micrometers of mercury. If the vapor pressure is less than about one micrometer, exceptionally high temperatures may be required to evaporate sufficient material for forming a coating on the sheet substrate at reasonable coating speeds. High temperatures may lead to thermal decomposition or premature curing of the monomers. If the vapor pressure is higher than about twenty micrometers of mercury, condensation of the monomer to form a film on the substrate may have too low an efficiency for practical coating operations. Adequate efficiency may not be obtained until the surface of the substrate is cooled below the freezing point of the monomer, in which case the material may not polymerize properly.

There are at least five monoacrylates, ten diacrylates, ten to fifteen triacrylates and two or three tetraacrylates which may be included in the composition. Most preferably the acrylate comprises hexane diol diacrylate (HDDA) with a molecular weight of 226 and/or tripropylene glycol diacrylate (TRPGDA) with a molecular weight of about 300. Other acrylates may be used, sometimes in combination, such as monoacrylates 2-phenoxy ethyl acrylate (M.W. 192), isobornyl acrylate (M.W. 208) and lauryl acrylate (M.W. 240), epoxy acrylate RDX80095 made by Radcure of Atlanta, Ga.; diacrylates diethylene glycol diacrylate (M.W. 214), neopentyl glycol diacrylate (M.W. 212), propoxylated neopentyl glycol diacrylate (M.W. 328) and polyethylene glycol diacrylate, tetraethylene glycol diacrylate (M.W. 302), and bisphenol A epoxy diacrylate; and triacrylates trimethylol propane triacrylate (M.W. 296), ethoxylated trimethylol propane triacrylate (M.W. 428), propylated trimethylol propane triacrylate (M.W. 470) and pentaerythritol triacrylate (M.W. 298). Monomethacrylates isobornyl methacrylate (M.W. 222) and 2-phenoxyethyl methacrylate (M.W. 206) and dimethacrylates triethylene glycol dimethacrylate (M.W. 286) and 1,6-hexanediol dimethacrylate (M.W. 254) may also be useful, but may cure too slowly to be useful for high speed coating operations.

It is known that adhesion may be enhanced between a sheet and an acrylate coating, by using an acrylate containing high molecular weight components. In practice very high molecular weight oligomers are usually mixed with low molecular weight monomers. The oligomers usually have molecular weights of greater than 1000 and often as large as 10,000 or even higher. The monomers are used as diluents to lower the coating viscosity and provide an increased number of acrylate groups for enhancing cure speed, hardness and solvent resistance in the resulting coating.

It has generally been considered that it is not feasible to evaporate high molecular weight acrylates because of their very low vapor pressure and high viscosity. Evaporated acrylate coatings have been restricted to low molecular weight monomers, generally below a molecular weight of about 400 and with low viscosity. Generally the viscosities are below 50 centistoke. For example, Henkel 4770, which is an amine acrylate, has a sufficiently high molecular weight that it has a viscosity of about 1000 centistokes at 25° C. This material cures in the evaporator before evaporating. Beta carboxy ethyl acrylate (BCEA) which has a viscosity of over 200 centistokes also cures in the evaporator.

It has been found, however, that by mixing a very low and a very high viscosity material, flash evaporation, condensation and curing can be obtained. For example, a mixture of 70 percent of Henkel 4770 and 30 percent diethylene glycol diacrylate has a viscosity of about 12 centistokes and can be successfully evaporated, condensed and cured. A mixture of 70 percent tripropylene glycol diacrylate (TRPGDA) and 30 percent of beta carboxy ethyl acrylate (BCEA) has a viscosity of about 15 centistokes and can be readily evaporated, condensed and cured. The low viscosity component lowers the viscosity of the blend, which improves atomization in the evaporator and assists in the flash evaporation of the high viscosity acrylate.

There is essentially a trade off between the molecular weights (and hence viscosities) of the high and low molecular weight acrylates. Generally, the lower the molecular weight and viscosity of the low molecular weight component, the higher the molecular weight and viscosity of the higher molecular weight component can be for satisfactory evaporation and condensation. The reason for good atomization in the flash evaporator is straightforward. This is essentially a physical effect based on the viscosity of the blend. The reason for successful evaporation is not as clear. It is hypothesized that the low molecular weight acrylate essentially dilutes the high molecular weight material and energetic evaporation of the lower molecular weight material effectively sweeps along the higher molecular weight material.

When blends of high and low molecular weight acrylates are used, it is preferred that the weighted average molecular weight of the blend be in the range of from 200 to 600 and preferably up to about 400. This assures that there is good vaporization of the blend at reasonable temperatures in the evaporator.

Some examples of low molecular weight acrylates are hexane diol diacrylate, diethylene glycol diacrylate, propane diacrylate, butane diol diacrylate, tripropylene glycol diacrylate, neopentyl glycol diacrylate, phenoxyethyl acrylate, isobornyl acrylate and lauryl acrylate. Some examples of high molecular weight acrylates are bisphenol A diacrylate, BCEA, Radcure 7100 (an amine acrylate available from Radcure, Atlanta Ga.), Radcure 169, Radcure 170, acrylated and methacrylated phosphoric acid, Henkel 4770 (an amine acrylate available from Henkel Corporation, Ambler, Pa.) and glycerol propoxy triacrylate.

Particularly preferred high molecular weight materials include BCEA which is acid in character and has a shrinkage of only about 4 percent upon curing. Another suitable material is an acrylate or methacrylate of phosphoric acid. One can also use acrylic acid in the composition, along with dimers, trimers and tetramers of acidic acrylates or methacrylates. For example, Henkel 4770 is polar and helps increase the cure speed and adhesion. In general, the higher molecular weight components are used to add flexibility, reduce shrinkage or provide some particular chemical characteristics such as acid or caustic resistance.

Figure 8:
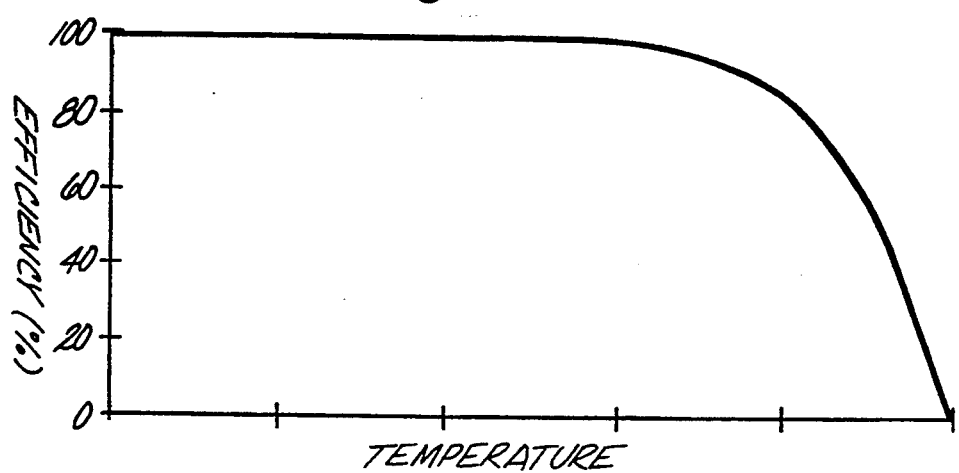
FIG. 8 is a graph illustrating condensation efficiency as a function of temperature.

It has been found that the temperature of the substrate on which the monomer film is deposited can have a large influence on the efficiency of condensation. The effect of temperature depends on the particular monomer. An exemplary indication of the efficiency as a function of temperature is illustrated in the graph of FIG. 8. At low temperatures such as close to 0° C., there is essentially 100% efficiency and all of the monomer condenses. At a somewhat higher temperature, such as for example, 25° C., little, if any, of the monomer actually condenses on the substrate. It can be seen that in some temperature ranges the efficiency of condensation is quite sensitive to relatively small changes in temperature.

Because the efficiency of condensation changes rather steeply in the general vicinity of ambient temperatures and since the flash evaporation and irradiation tend to raise the temperature of the substrate, it is desirable to refrigerate the roll of substrate until it is placed on the pay-out reel in the coating apparatus. It is also desirable to cool the rotating drums, such as for example, with chilled water, so that the substrate remains at a low temperature.

When the sheet being coated is smooth and thin (generally less than 12 micrometers) good condensation efficiency can be obtained with monomers having a molecular weight of at least 200 with the coating drum cooled to temperatures in the range from 0° to 15° C. This has been observed with either polypropylene or polyester sheet coated at speeds in the range from about 80 to 330 meters per minute. When thicker sheet is used, condensation efficiency may decrease dramatically. For example, polypropylene sheet having a thickness of about 20 micrometers showed a condensation efficiency below 70% when coated at comparable speeds with a temperature less than about $-9°$ C. These tests were made without precooling the substrate on the payout reel. Thus, it appears as though there is not enough time for the cooling to fully penetrate the substrate sheet as it moves over a chilled coating drum at high speed. Therefore, the exposed face of the sheet is not cool when it is exposed to the acrylate vapor.

FIG. 8 includes a series of data points showing measured condensation efficiencies of hexane diol diacrylate monomer as a function of the substrate temperature. HDDA is a relatively volatile monomer with a molecular weight about 212. A less volatile monomer such as tripropylene glycol diacrylate with a molecular weight of about 300 has higher condensation efficiency. However, even this material requires some degree of cooling.

The molecular weight of the monomer should not be increased too much because the vapor pressure decreases rapidly with increasing molecular weight. To evaporate very high molecular weight monomers such as above about 600, the evaporator temperature needs to be increased to as much as 350° C. Such extreme evaporator temperatures can degrade the monomer molecules. Preferably, the acrylate monomer molecular weight is kept below about 600.

An extreme amount of cooling of the substrate must also be avoided. For example, HDDA freezes on the substrate when the coating drum temperature is below about 0° C. The frozen monomer cannot be polymerized. Thus, the cooling temperature must hold the surface of the substrate above the freezing point of the monomer but below the temperature at which the condensation efficiency decreases significantly.

As an alternative to or in addition to precooling the roll of substrate the sheet can be cooled on the front surface preceding the evaporator. For example, the idler roll 42 between the payout reel and the first drum may be chilled for cooling the front surface of the substrate sheet before it reaches the first drum.

It might also be noted that in applications where the surface of the substrate being coated with acrylate monomer is relatively rough, precooling by way of the rotating drum may not be adequate and precooling of the roll of substrate sheet may be required. For example, deposits were made on 9 micrometer thick translucent polypropylene sheet with relatively low deposition efficiency. The sheet has a surface roughness of about ½ to 1 micrometer. The drum behind the sheet on which the acrylate was deposited was cooled to a temperature of about 0° to 4° C. The condensation efficiency was less than about 70 percent since the rough sheet did not make good thermal contact with the chilled drum. This can be compared with smooth sheet with comparable thickness and coating speed where the deposition efficiency is about 99 percent. Precooling the roll of sheet before placing it in the vacuum apparatus also restores high efficiency condensation.

Precooling of a sheet of material on which the acrylate is to be deposited can be significant for applications in addition to preparation of sheet material for winding capacitors. For example, there are times that it is desirable to coat paper with an acrylate and the rough surface of paper does not lend itself to cooling from the back surface on a rotating drum. Similarly, when the sheet being coated is relatively thick so that there is insufficient time to cool the entire thickness of the sheet precooling may be important.

Surprisingly, when a technique as described for forming an acrylate layer on a polypropylene substrate was tried, the acrylate monomer could not be cured by a radiation with an electron gun. It was found that acrylate monomer condensed to form a film on the polypropylene substrate but it could not be polymerized. The electron gun current was increased by a factor of five and the electron beam voltage was doubled from about 10 Kv to about 20 Kv. The coating speed was reduced from about 150 meters per minute to less than 40 meters per minute and that still did not result in a cure. It was known that there was adequate electron flux and sufficient energy to completely penetrate the acrylate layer, but the coating did not cure.

It is hypothesized that the surface of untreated polypropylene sheet takes on a negative charge during the curing process which can repel the incoming electron beam. Polypropylene is an outstanding insulator, which is a reason for its choice as a capacitor dielectric. For example, polypropylene sheet has a dissipation factor of about 0.02 percent as compared to a value of from about 0.3 to 1 percent for polyester. The excellent insulation provided by the polypropylene facilitated the formation of a surface charge.

It was found that curing an acrylate monomer on a polypropylene substrate is feasible once the surface conductivity of the sheet is increased. This can be correlated with surface tension. Untreated polypropylene sheet has a surface tension of about 25 to 32 dynes/cm$^2$. It was shown that an acrylate coating on a sheet of polypropylene with a surface tension of about 34 to 35 dynes/cm$_2$ could not be cured with the electron beam. It was also shown, however, that a polypropylene sheet with a surface tension of about 36 to 40 dynes/cm$_2$ could be readily coated and cured. Surfaces treated to have a tension as high as 56 dynes/cm$_2$ have been tested and acrylate monomer films can be easily cured by electron bombardment.

The treatment of the surface is beneficial for polyester and other non-conductive surfaces, but the effect is not as dramatic as with polypropylene.

The surface conductivity of the polypropylene sheet can be modified before any of the coating steps described above by a pretreatment, or a surface treatment may be applied in-line in the same process as the coating operation. The most common technique for treating the substrate sheet on an off-line basis is to expose it to a corona discharge in air or nitrogen. This activates the substrate surface and also oxygen and nitrogen which react with the activated surface. These chemical groups are apparently incorporated onto the surface and change the surface conductivity and surface tension.

During investigation of alternative techniques for treating the surface of a film, it has been discovered that surface treatment within the vacuum chamber is of substantial importance for all surfaces, not just the surface of the raw film. Prior treatments in air may produce a benefit that decay with time. Thus, it is found desirable to plasma treat the surface to be coated immediately before coating. A conventional plasma gun 52 is positioned in the vacuum chamber upstream from each of the flash evaporators 43 and 49 for activating the surface of the sheet on a continuous basis before monomer deposition. Another plasma gun 52 is provided immediately before the vacuum metallizing station 46. Conventional plasma generators are used.

In an exemplary embodiment the plasma generator is operated at a voltage of about 500 to 1000 volts with a frequency of about 50 Khz. Power levels are in the order of 500 to 300 watts. For an exemplary 50 cm wide film traveling at a rate of 30 to 90 meters per minute, around 500 watts appears appropriate.

It is been found that without plasma treatment of the surface there can be poor adhesion of the deposited materials. The thickness of the film deposited and the chemistry of the acrylate are factors subordinated to the surface preparation, It is hypothesized that during the deposition process there is some evaporated acrylate monomer distributed throughout the remaining gas in the vacuum chamber. This monomer may condense on cooler film before the film reaches the evaporation station or between the curing station and the metallization station. In the activated environment within the vacuum chamber, some of the monomer may be partially reacted and thereby form an intervening layer between the substrate and deposited coating that reduces adhesion. The acrylate, for example, cures most efficiently when the entire layer of acrylate cures at once. Thus, it is important to remove the partially cured layer of condensed acrylate before further deposition.

There is evidence that acrylate monomer is depositing on the film. The monomer has a characteristic odor which is not present in the crosslinked acrylate. The odor can be detected on a variety of surfaces after removal from the vacuum chamber. For example, one can coat a sheet of paper with an acrylate layer which is cured, followed by metallizing. An acrylate odor can be detected on both the front and back faces of the sheet.

However, if the back face of the sheet is isolated, such as by leaving it in contact with the drum in the coating apparatus, an acrylate odor can still be detected on the metal coated face, but there is no acrylate odor on the protected face. This indicates that acrylate monomer is condensing on the metal layer after its deposition. Direct deposition on the back face is prevented by the drum and the cured acrylate and metal layers prevent the acrylate monomer odor from passing through the paper.

Sequential plasma treatments for removing deposited acrylate monomer may be minimized by partitioning the evaporator from the rest of the vacuum chamber. For example, tight fitting baffles cooled with liquid nitrogen can serve to condense stray monomer from the evaporator and provide a tight or tortuous path for minimizing transmission of the monomer that does not condense.

An initial plasma treatment before the first coating of acrylate remains of importance, however. Plastic films appear to have surface contamination that interferes with adhesion and removing the contamination before depositing metal or acrylate is desirable. Such surface contamination may be from processing aids used in the manufacture of the film, non-polymerized constituents of the film or materials that deposit on the film after its original fabrication. Interestingly, with films that are pre-metallized on one face before loading in the vacuum chamber, there appears to be a film on top of the metal which interferes with adhesion of an acrylate. It is hypothesized that interfering materials on the back face of the film which is not metallized are in part transferred to the metallized face while the material is in a roll. Significantly enhanced adhesion is obtained by plasma treating the metal layer before depositing an acrylate monomer.

The exact effect of the plasma treatment is not known. It could be that oxygen in the plasma reacts with carbonaceous compounds on the surface, which are then removed as carbon dioxide, water, etc. It could be that there is plasma etching of the surface. It could simply be that the high activation energy of the plasma is essentially blasting surface contaminants off of the film.

The gas used in the plasma treatment does not appear to be critical. No significant differences have been observed between plasma treatments using air, nitrogen or oxygen. It is hypothesized that air or oxygen is best for treating an aluminum surface since the oxidation may make the somewhat acidic aluminum more nearly neutral. It has also been hypothesized that the surface is made more polar by reason of plasma treatment. Regardless, it has been found desirable to employ plasma treatment before each acrylate deposition step, and in some cases, before the vacuum metallizing.

As described hereinafter, coating of plastic films with crosslinked acrylate and/or metal significantly enhances the barrier properties of the film for use in packaging. When films used in packaging food products, cigarettes or many other items, the presence of an acrylate odor is unacceptable. Any such odor can be eliminated by curing any residual acrylate monomer on the film before it is removed from the vacuum chamber.

An electron gun 53 is mounted in the vacuum chamber between the final idler roll 42 and the take-up reel 41. Electron bombardment from the gun polymerizes any residual acrylate monomer on the surfaces of the film before it is rolled up. Ultraviolet radiation could be used instead. The electron gun is arranged to irradiate the film in the converging region between the film on the take-up reel and the film advancing from the idler roll. By irradiating in this converging space both faces of the film can be irradiated with a single electron gun.

A sheet capacitor is often constructed by winding two sheets of metallized plastic sheet together, with the metallized layer on one sheet being one electrode of the capacitor and the metallized layer on the other sheet being the other electrode. The two sheets are offset from each other so that at each end of the roll the edge of one sheet extends beyond the edge of the other sheet. The electrical contact to the two electrodes is made by way of the protruding edge of each electrode at opposite ends of the roll.

Molten zinc or lead-tin solder is then sprayed onto the ends of the roll (a process called Schooping) to establish electrical contact with the metallized layer. A connecting lead is either welded or soldered to the relatively thick contact material. The zinc or solder Schooping apparently enters between the metallized plastic sheets and may melt a portion of the sheet to make mechanical and electrical contact to the thin metallized layer on the sheet.

The thin metallized layer often comprises either zinc or aluminum. The thin layer imparts a self-healing feature to the capacitor. When a short occurs in the sheet dielectric the adjacent thin metal layer is evaporated from around the short and eliminates the shorted area from the capacitor circuit. The self-healing allows a thin film capacitor to be operated at very high electrical stress.

It is desirable to reduce the thickness of the metallized layer as much as possible to optimize this self-healing feature. Unfortunately, this often leads to enhanced corrosion of the thin electrode material by oxidation and hydrolysis. For example, very thin zinc electrodes lose considerable conductivity due to corrosion when exposed for a few days at high humidity. A zinc metallized layer is stored in a sealed container with a desiccant to prevent corrosion. It is desirable to reduce the thickness of the metal layer to increase the reliability and operating electrical stress of the capacitor but without increasing the tendency of the metal layer to lose conductivity by corrosion.

It is preferred to have a layer of polymerized acrylate overlying the metallized layer of the capacitor material. A layer of acrylate in the range of from about 0.1 to 1 micrometer thick has been found sufficient to prevent corrosion of a zinc electrode in a high humidity environment. Furthermore, the overlying layer of acrylate improves the scratch resistance of the metallized electrode. The electrode may be abraded during slitting of the metallized sheet or winding a capacitor. An overlying acrylate layer effectively prevents damage from such scratching. The overlying layer of acrylate also helps confine the tiny arc that occurs adjacent to a short, which increases its temperature for more efficiently evaporating the metal from around the shorted area. This, and the presence of oxygen in the acrylate material, enhance the self-healing of the capacitor.

Figure 9:
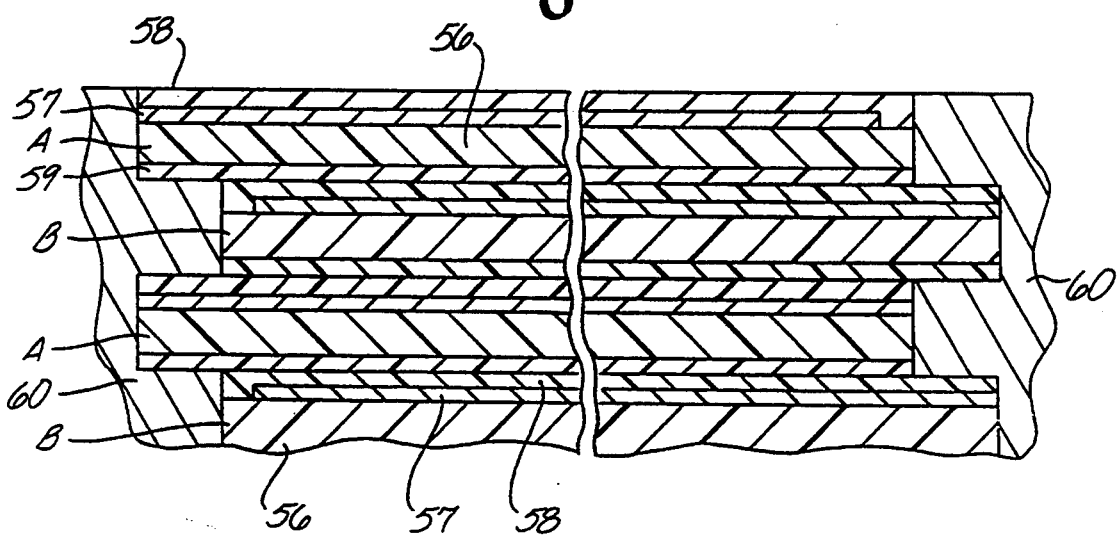
FIG. 9 is a fragmentary cross section of a capacitor made with metallized sheet coated with a polymerized acrylate.
Figure 10:
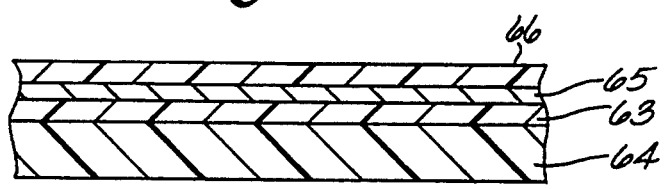
FIG. 10 illustrates in transverse cross section a coated polypropylene with low oxygen permeability.

FIG. 9 illustrates in a fragmentary transverse cross section a few layers of a preferred capacitor. Each of the layers of the capacitor comprises a substrate sheet 56 having a metallized layer 57 on one face. A layer 58 of polymerized acrylate is deposited over each metallized layer. A second acrylate layer 59 may deposited on the opposite face of each dielectric sheet 56 for isolating the sheet from dielectric capacitor liquid, although that is not necessary in all cases. A metal contact electrode 60 is sprayed onto each end of the roll of metallized sheets.

The edges of the two sheets forming the capacitor are offset from each other. Thus, at one end of the capacitor, the edge of one sheet A extends beyond the edge of the intervening sheet B which is recessed. At the opposite end of the capacitor the recessed sheet B extends beyond the edge of the interleaved sheet A. This permits electrical contact to be made to the metallized layers on the respective sheets at opposite ends of the capacitor.

In this embodiment the metallized layer on each sheet extends to one edge of the sheet and does not extend all the way to the opposite edge of the sheet. Thus, for example, as illustrated at the left edge of FIG. 9, the metallized layer extends all the way to the edge of the protruding sheets A. On the other hand, the metallized layer on the recessed sheets B stop short of the edge of the sheet. Because of this, when the contact metal 60 is sprayed onto the end of the roll, electrical contact can be made to the metallized layer on the protruding sheet and the metallized layer on the recessed sheet is electrically insulated by the plastic material.

Surprisingly, despite the substantially complete enclosure of the metallized layer by acrylate and polypropylene plastic, good electrical contact is made when the electrical contact is sprayed onto the end of the roll. It is believed that a small amount of thermoplastic dielectric sheet melts, thereby assuring good electrical contact with the metallized layer. Polypropylene has a melting temperature of about 165° C. and the cross linked acrylate does not melt. The metallized layer is, in effect, supported by the polymerized acrylate which resists higher temperatures. Good electrical contact was demonstrated by a standard 10 KHz dissipation factor test.

Capacitors were constructed from an eight micrometer thick polypropylene sheet. The sheet was coated on one face with a zinc layer having a resistance of about 6 ohms per square. The metallized polypropylene sheet was coated with layers of polymerized acrylate as hereinabove described. Eight and ten microfarad capacitors were rolled and the ends were sprayed with zinc Schooping to make electrical contact. The capacitors were potted in a tar material before life testing for 2000 hours at 500 volts AC and 85° C. After 2000 hours there was negligible change in capacitance or any other property of the capacitor. The capacitor voltage was stepped to 650 volts AC and then to 720 volts AC. After 1000 hours at each voltage, the loss in capacitance was less than 1%. The dissipation factor of these capacitors was stable during the testing at about 0.15% at 1 KHz. This is considered outstanding performance relative to capacitors without an acrylate coating.

Coated films show considerable resistance to corrosion and cracking of metal layers. A variety of coated samples were made for measuring corrosion. The underlying substrate was either 12 micrometer thick polyethylene terephthalate (PET) or 15 micrometer thick polypropylene (PP) film. Acrylate coatings about 0.5 micrometers thick were deposited using tripropylene glycol diacrylate as the monomer. An aluminum layer was metallized approximately 350 Å thick. The samples were made by coating the film at a speed of about 75 m/min. The test samples were cut from the coated roll of film.

The samples were tested by immersing in PXE at 100° C. Samples were periodically removed from the PXE and their resistance measured by determining the current at a known voltage. The samples were also examined through a 10 power microscope with back lighting. An estimate was made of the amount of the electrode that was corroded. An intact film appears dark through the microscope. Corrosion appears as clear spots on the film. It appears that as polypropylene or polyethylene terephthalate swells, the electrode cracks, which leads to corrosion of the film. These tests showed that the acrylate coating has a pronounced effect in preventing damage to the aluminum electrode deposited on polypropylene film. The acrylate coating has a much lower effect on PET since this material does not swell as much in PXE.

In one set of tests, a PP film was coated with aluminum and after only one hour, more than 50 percent of the aluminum film was corroded. A PP film was coated with a layer of acrylate followed by a layer of aluminum. A third sample was similar to the second and in addition a layer of acrylate was formed on the face of the polypropylene opposite to the face that received the aluminum layer. In both of these latter samples, the amount of corrosion was estimated to be less than two percent after 165 hours of immersion in PXE. These tests demonstrate that the protection afforded by the acrylate is largely isolation of the aluminum from the swelling effect of the polypropylene. The acrylate layer appears to provide mechanical support for the aluminum.

The electrical resistance of the aluminum layer on a PP substrate also indicates the protection afforded by a layer of crosslinked acrylate. The resistance of an aluminum layer as deposited was less than one ohm per square. A sample with a layer of aluminum on a PP substrate had a resistance that increased to about ten ohms per square after 21 hours of immersion in PXE. Samples with a layer of crosslinked acrylate and aluminum on a PP substrate had essentially unchanged resistance after 115 hours of immersion in PXE regardless of whether there was also a layer of acrylate on the opposite face of the polypropylene.

Three similar samples were made except that the substrate was PET instead of PP. In a sample where there was an aluminum layer on a PET film, the corrosion after 165 hours in PXE is estimated to be about two to three percent. A sample with an acrylate layer and layer of aluminum on PET shows a corrosion of about one percent. A sample with an acrylate coating on each face of PET and a layer of aluminum over one of the acrylate coatings shows a corrosion of substantially less than one percent after 165 hours of immersion.

The electrical resistance of an aluminum layer on a PET substrate did not give meaningful results. A sample with a layer of acrylate and a layer of aluminum on a PET substrate had an electrical resistance that increased to a little more than one ohm per square after 115 hours of immersion in PXE. A layer of aluminum on a PET substrate without protection by an acrylate layer had essentially unchanged electrical resistance after 115 hours of immersion. With acrylate layers on both faces the electrical resistance of the samples was essentially unchanged.

As has been mentioned, the nozzle for the flash evaporator typically comprises a slot extending longitudinally along the evaporator chamber. In an exemplary evaporator, the nozzle slot may have a width in the range of from 0.75 to 1 mm. The surface of a substrate on which the monomer is condensed may be moved past the nozzle at a distance from the nozzle of about 2 to 4 mm. Typical speed of traverse of the substrate past the nozzle is in the order of 100 to 500 meters per minute.

It has also been discovered that polypropylene, polyester or nylon films with thin surface coatings of evaporated and crosslinked acrylate have very low oxygen permeability. There is a great need for low cost packaging materials for food products, for example, where the oxygen permeability of the package is low for preserving the freshness of the packaged goods. Metallized plastic sheet is used for this purpose. Typical sheets for packaging foodstuffs include metallized nylon or polyester sheet. Metallized nylon has an oxygen permeability of about 0.05 ml/100 in$^2$/hour (ml/645 cm$^2$/hour) as measured with a Mocon Oxtran System available from Modern Controls, Minneapolis, Minn. Metallized polyester has a typical oxygen permeability of about 0.08. Metallized polypropylene, on the other hand, has an oxygen permeability of about 2.5 and is not usually suitable for packaging where low oxygen permeability is important.

It is believed that the high oxygen permeability of metallized polypropylene is due to the inherent surface roughness of the polypropylene sheet. Nylon and polyester sheets are considerably smoother and a metal coating of uniform thickness can be readily applied as a good oxygen barrier. Typically, polypropylene may have a surface roughness in the order of $\frac{1}{2}$ to one micrometer, or more in some sheets. A layer of acrylate in the same order, namely about $\frac{1}{2}$ to one micrometer thick is adequate for smoothing the surface for producing a low oxygen permeability.

Sheet polypropylene without any coating may have an oxygen permeability of about 100. However, if a layer of aluminum 65 applied to a surface of a polypropylene sheet substrate 64, the oxygen permeability decreases to about 2.5. Surprisingly, when an acrylate layer 63 only about one micrometer thick is formed on the polypropylene and then covered with a layer of metal 65, the oxygen permeability drops to about 0.05, a value lower than metallized polyester. It is hypothesized that the film of liquid acrylate monomer deposited on the surface of the polypropylene has a smooth, high temperature surface and the surface remains smooth when the acrylate is polymerized. The metallized layer can then form a good oxygen barrier.

A transparent barrier film may be formed on a polypropylene, polyester or nylon substrate, or on other sheets, including paper. First, a layer of acrylate monomer is deposited on the substrate and crosslinked. The acrylate layer is then coated with a layer of $SiO_x$ or aluminum oxide, both of which have good resistance to oxygen permeability. The high temperature resistance of the acrylate layer permits the notably higher temperature deposition of silicon oxide or aluminum oxide on the thermoplastic substrate. Typical techniques for depositing these materials may include sputtering aluminum or silicon in an oxygen plasma atmosphere for depositing the oxide, or plasma enhanced chemical vapor deposition. With these processes, a separate plasma surface treatment preceding the deposition of the transparent oxide may not be required.

A still greater surprise occurs when another polymerized acrylate layer 66 is formed over the metallized layer. The permeability through a polypropylene barrier material drops to about 0.002 which is appreciably better than the oxygen permeability of metallized nylon. It is hypothesized that the second acrylate layer may protect the metallized layer and assure retention of the oxygen barrier properties of the metal. Oxygen barriers are further enhanced by multiple layers, such as, for example, a thermoplastic substrate with layers of acrylate, metal, acrylate, metal and acrylate. Furthermore, when multiple coating layers are applied, any pinholes or other local defects in a layer are likely to be offset from similar pinholes or defects in underlying layers. Thus, oxygen permeability through pinholes is effectively eliminated.

A preferred sheet of material with low oxygen permeability has a layer of polymerized acrylate, a layer of barrier material such as $SiO_2$, $Al_2O_3$, or metal and another layer of polymerized acrylate on a sheet plastic substrate. The layers of acrylate reduce permeability dramatically and the layer overlying the barrier material protects the barrier material from mechanical damage and corrosion, and also provides a surface suitable for printing.

The substantial improvement in oxygen permeability is believed to be attributable to formation of a liquid film of monomer on the surface of the polypropylene, followed by cross linking of the polyfunctional acrylate. Applying the layer by condensing as a liquid assures smooth and uniform coating of the substrate, thereby forming an excellent surface for receipt of the metallization. Cross linking upon curing the acrylate produces a material having low inherent oxygen permeability. Adding a second layer of acrylate monomer which is polymerized in situ is believed to rectify any defects in the underlying layers and provide an additional thickness of material with inherently low oxygen permeability.

The polymerized acrylate layer is believed to be beneficial for a number of other reasons. As a thermoset material, it has higher temperature resistance than the thermoplastic substrate. In the coating process, the sheets are subjected to elevated temperature processing such as metallizing, plasma treatment and the like. Particularly high temperatures may be encountered when depositing transparent barrier coatings. Various volatile materials, such as water vapor or plasticizers, may be emitted by thermoplastic surfaces under these conditions. These may adversely affect the properties of the coating such as adhesion, nucleation and growth, and thereby reduce the barrier properties. A cured acrylate coating would not have such emissions and may seal the surface and inhibit emission of such materials from a thermoplastic substrate.

The acrylate layer is substantially free of volatile materials because of the vacuum processing. Any volatile materials included in the monomer evaporate with the monomer. Since the monomer barely condenses on the substrate at usual deposition temperatures, volatile materials do not condense and disappear into the vacuum pumps. In effect, the monomer is vacuum distilled during processing.

A polypropylene sheet coated with a layer of polymerized acrylate and a metallized layer, and preferably coated with an additional layer of polymerized acrylate, not only has lower oxygen permeability than prior materials it also has a lower cost. Such material should find wide application as low oxygen permeability packaging sheet.

In applications where a transparent oxygen barrier is applied or in some applications with a metallized layer, a layer of acrylate shows a slightly colored or tinted appearance due to interference patterns. Packagers find such an appearance undesirable. In such cases an acrylate layer having a thickness of about 1.2 to 1.5 micrometers can avoid the interference colors.

Many modifications and variations in the coating of thermoplastic sheets for use in capacitors or for low oxygen permeability will be apparent to those skilled in the art. For example, the sequence of coating operations and the coated substrate may be varied appreciably.

The description has been concentrated on the coating of film substrates. It may also be desirable to coat three dimensional objects such as cosmetic or medical containers. The same principles may be used for these objects as well. For example, it has been found desirable to chill a roll of film before placing it in the vacuum chamber so that monomer quantitatively condenses on the chilled surface. Racks of containers may also be chilled before placing in the vacuum chamber and promptly processed so that condensation is enhanced. Adhesion to such surfaces may also be enhanced by plasma treatment immediately before deposition.

Thus, it will be understood that within the scope of the following claims this invention may be practiced otherwise than as specifically described.

What is claimed:

1. A wound capacitor comprising:
   at least one thermoplastic dielectric sheet wound into a cylinder;
   a metallized conductive layer deposited on at least one face of the dielectric sheet;
   a layer crosslinked acrylate in direct contact with the metallized layer; and
   an electrical contact made to the conductive layer at an end of the cylinder by Schooping.

2. A capacitor as recited in claim 1 wherein the acrylate layer overlies the entire metallized layer.

3. A capacitor as recited in claim 1 comprising a dielectric fluid impregnating the cylinder.

4. A capacitor as recited in claim 1 wherein the first layer of crosslinked acrylate underlies the conductive layer and further comprising a second layer of crosslinked acrylate deposited over the conductive layer.

5. A capacitor as recited in claim 1 further comprising a second layer of crosslinked acrylate deposited on the face of the dielectric sheet opposite to the face having the conductive layer.

6. A wound capacitor comprising;
   a polypropylene or polyester dielectric sheet wound into a cylinder;
   a layer of crosslinked acrylate deposited on a face of the dielectric sheet, the acrylate layer being formed from acrylate monomer having a molecular weight in the range of from about 150 to 600 and including at least a portion of polyfunctional acrylate molecules for crosslinking;
   a metallized conductive layer deposited over the acrylate layer;
   a second layer of crosslinked acrylate deposited over the conductive layer; and
   a dielectric liquid filling the capacitor.

7. A capacitor as recited in claim 6 wherein an acrylate layer overlies the entire conductive layer.

8. A capacitor as recited in claim 6 wherein the acrylate is formed from acrylate monomer having a molecular weight in the range of from about 200 to 400 and including at least a major portion of polyfunctional acrylate molecules for crosslinking.

9. A capacitor as recited in claim 6 further comprising a third layer of crosslinked acrylate deposited on the face of the dielectric sheet opposite to the face having the conductive layer.

10. Metallized capacitor sheet for forming a wound capacitor comprising:
    a thermoplastic polypropylene or polyester dielectric sheet;
    a metallized conductive layer deposited on at least one face of the dielectric sheet;
    a first layer of polymerized acrylate deposited on the same face of the dielectric sheet as the conductive layer; and
    a second layer of polymerized acrylate deposited on the face of the dielectric sheet opposite from the face having a conductive layer for isolating the dielectric sheet, the acrylate layers being formed from acrylate monomer having a molecular weight in the range of from about 150 to 600 and including at least a portion of polyfunctional acrylate molecules for crosslinking.

11. A barrier sheet with low oxygen permeability comprising:
    a polypropylene, polyester or nylon sheet substrate;
    a first crosslinked evaporated acrylate layer covering one entire face of the substrate, the acrylate layer being a polymerization product of acrylate monomer having a molecular weight in the range of from 150 to 600; and
    a layer of oxygen barrier material selected from the group consisting of silicon oxide, aluminum oxide and metal, vapor deposited over the first acrylate layer and covering the entire face of the sheet; and
    a second crosslinked evaporated acrylate layer deposited over the oxygen barrier layer, the second acrylate layer also covering the entire face of the sheet and being a polymerization product of acrylate monomer having a molecular weight in the range of from 150 to 600.

12. A sheet as recited in claim 11 wherein the crosslinked acrylate is a polymerization product of acrylate monomer having a molecular weight in the range of from 200 to 400.

* * * * *